No. 713,057. Patented Nov. 11, 1902.
A. J. BUSH.
TOBACCO STEMMING MACHINE.
(Application filed Mar. 24, 1902.)
(No Model.)
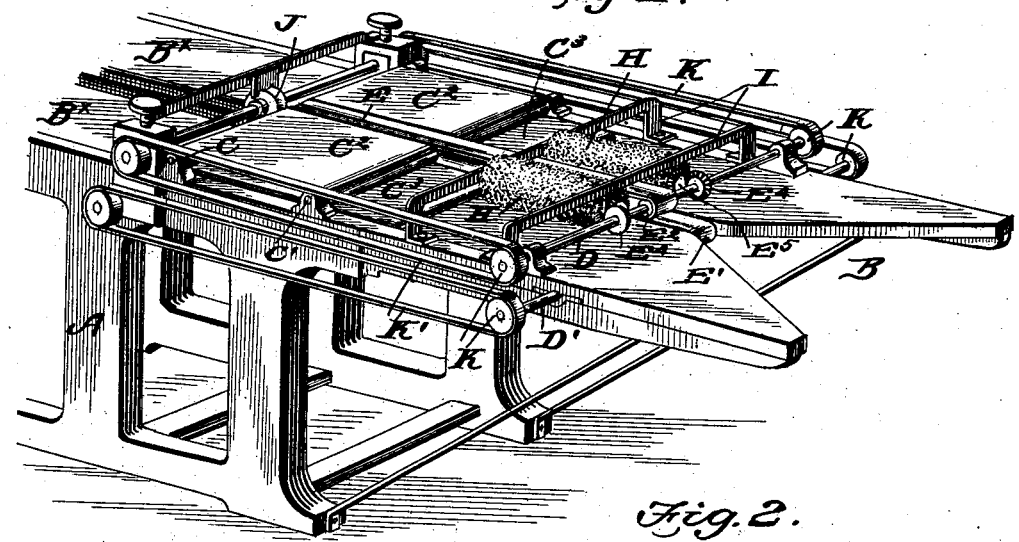
Fig. 1.
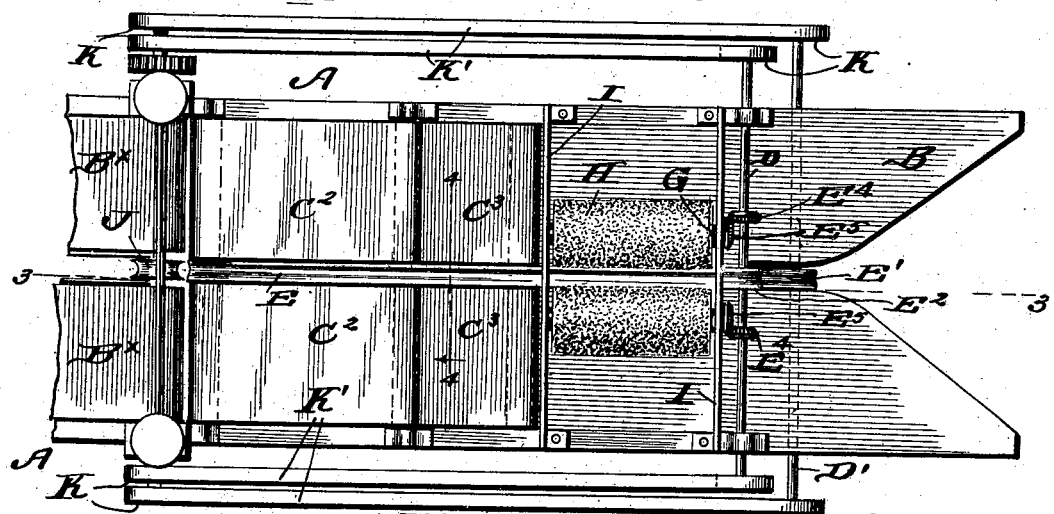
Fig. 2.
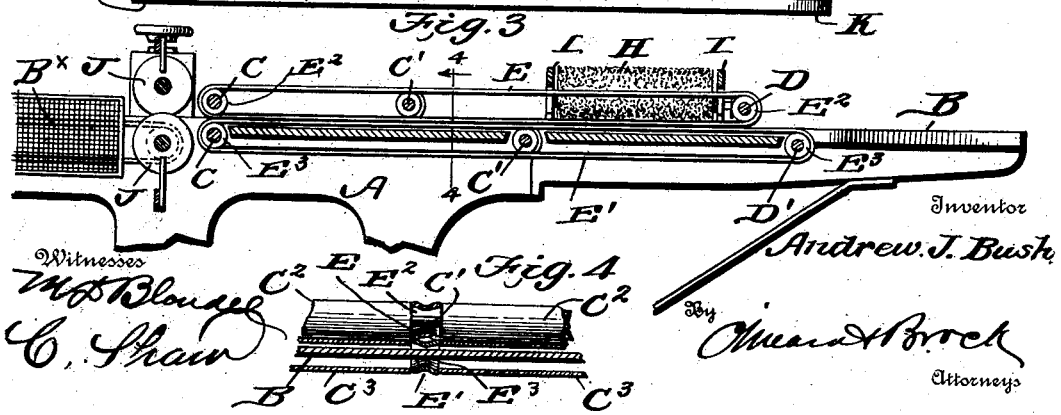
Fig. 3.
Fig. 4.
Witnesses
Inventor
Andrew J. Bush
Attorneys

UNITED STATES PATENT OFFICE.

ANDREW J. BUSH, OF KAUFMAN, TEXAS.

TOBACCO-STEMMING MACHINE.

SPECIFICATION forming part of Letters Patent No. 713,057, dated November 11, 1902.

Application filed March 24, 1902. Serial No. 99,754. (No model.)

*To all whom it may concern:*

Be it known that I, ANDREW J. BUSH, a citizen of the United States, residing at Kaufman, in the county of Kaufman and State of Texas, have invented a new and useful Tobacco-Stemming Machine, of which the following is a specification.

My present invention relates to an improvement in tobacco-stemming machines, and particularly to a machine for which an application for patent was filed by me July 7, 1900, and patented February 25, 1902, No. 694,130, the object of the present device being to provide an arrangement for opening the leaves prior to being fed to the cutters.

With the above object in view my improvement consists of a pair of feed-belts between which the leaf is held and carried past a pair of brushes, which are designed to engage the leaf and spread or open it, so that after the stem has been removed the halves will be ready for use without necessitating a further operation thereon.

My invention also consists in the peculiar construction and arrangement of the belts and brushes and the manner of driving them, all of which will be fully described in the following specification and pointed out in the claims, reference being had to the drawings, in which—

Figure 1 is a perspective view of my improvement in position upon a stemming-machine. Fig. 2 is a plan view of the same. Fig. 3 is a longitudinal section taken about on the line 3 3 of Fig. 2, and Fig. 4 is a detail section taken about on the line 4 4 of Figs. 2 and 3.

In my former patent hereinbefore referred to I employ a pair of wide flat belts carried upon pulleys which are suitably supported upon a frame and driven by belts from any suitable power, the said belts being designed to carry or feed the leaf of tobacco to and through the cutters which remove the stem; but in the said machine it is necessary to open or spread the leaf before inserting it between the feed-belts, and it is therefore the purpose of my present device to automatically open the leaf before it reaches the cutters.

By reference to the drawings it will be seen that I employ a frame A, having a suitable table B and delivery-belts $B^{\times}$, arranged at the opposite ends of the frame, the table being arranged in the front end of the machine and upon which the leaves are placed to be within easy reach of the operator, the said table being divided, so that the operator may stand near the feed-belts and have the leaves upon either side and within easy reach. Suitably mounted upon the frame are series of shafts C and C' and D and D', the shafts C and C' having enlarged surfaces upon which are designed to travel belts $C^2$ and $C^3$, between which and arranged centrally of the frame are feed-belts E and E', which extend a considerable distance in front of the belts $C^2$ and $C^3$ and are supported at the forward and rear ends by concaved pulleys $E^2$ and $E^3$, carried by the shafts C and C' and D and D', the latter being journaled in brackets mounted upon the frame, and upon the shaft D is mounted beveled gears $E^4$ $E^4$, which are designed to mesh with gears $E^5$ $E^5$, carried by shafts G G, upon which is suitably held brushes H H, the said shafts G being supported by suitable brackets I I, arranged upon the main frame, as shown. Suitable cutters J J are arranged upon the frame directly in rear of the centrally-arranged feed-belts E and E', and from the shafts of the cutters motion is imparted to the shafts carrying the belts by means of pulleys and belts K and K', respectively. By reference to the drawings it will be noted that the lower feed-belt extends a slight distance in front of the upper belt, which is for the purpose of allowing the operator an easier feed than if the belts terminated in the same vertical alinement, and by making the bearing-surface of the pulley concaved or grooved it allows a slight space to intervene centrally between the belts and the stems to freely pass the pulleys, and thereby prevent injury to the leaf.

In operation the leaf is first slightly opened or spread at the butt-end and the stem inserted between the central feed-belts, which being constantly in motion draws the leaf through the machine, and while passing the brushes are spread or brushed out to their fullest extent, leaving them flat, and in that condition are drawn between the side or supplemental feed-belts to the cutters, which sever the stem from the leaf, the former dropping down under the machine through the openings and the latter onto the delivery-belts B×, where they are fed or conveyed to a box or other receptacle.

It will thus be seen that I employ an exceedingly simple device that may be readily applied to machines built in accordance with my former patent, the only change being necessary is that of dividing the wide feed-belts.

It will also be noted that the belts are all driven at the same speed, which is a distinct advantage, as it prevents to a minimum degree any injury to the leaf.

Having thus fully described my invention, what I claim as new, and desire to secure by Letters Patent, is—

1. In a tobacco-stemming machine the combination of a frame having centrally-arranged feed-belts operating therein, supplemental feed-belts arranged upon either side of the centrally-arranged belts, brushes mounted upon either side of the said central belts and in advance of the said supplemental belts, cutters arranged at the rear end of the said central belts and means for operating the belts, brushes and cutters substantially as shown and described.

2. In a tobacco-stemming machine the combination of a frame having a table arranged thereon, the forward end of which is bifurcated, belt-shafts mounted on the frame at the forward and rear end of said table, centrally-arranged feed-belts carried by the said shafts and arranged one above the other, the lower one of which extending in advance of the upper belt, shafts arranged upon the frame intermediate the first-named shafts, supplemental belts arranged upon the said shafts in the rear of the machine and on the intermediate shafts, brackets arranged upon the table, brushes mounted in the brackets, cutters mounted upon the frame and means for operating the said belts, brushes and cutters substantially as shown and described.

3. In a tobacco-stemming machine, the combination of a frame having a table mounted thereon, shafts mounted thereon near the forward end and at the rear end thereof, the said shafts in the rear of the table being arranged in vertical alinement, one of the shafts at the forward end of the table being arranged below and in advance of the adjacent forward shaft, grooved enlargements on the shafts, feed-belts mounted on the said enlargements, shafts mounted upon the frame intermediate the first-named shafts, the lower one arranged in advance of the upper shaft, supplemental feed-belts mounted upon the said rear shafts and the intermediate shafts, brackets mounted upon the said table and having shafts journaled therein, brushes mounted upon the last-named shafts, shafts carrying cutters arranged in rear of the said belts and means for operating the said belts, brushes and cutters, substantially as shown and described.

4. In a tobacco-stemming machine, the combination of a frame, a table mounted upon the forward end thereof and delivery-belts carried at the rear end of the frame, shafts arranged at the rear and near the forward end of the table, feed-belts operating on the said shafts, intermediate shafts arranged upon the table, supplemental feed-belts operating upon the said rear shafts and the said intermediate shafts, brackets mounted upon the table in advance of the said supplemental belts, shafts carrying brushes journaled in the said brackets, gears arranged upon the said brush-shafts and adapted to mesh with gears carried by the upper forward shaft whereby motion is imparted to the said brush-shafts, and rotary cutters mounted upon the frame intermediate the said table and delivery-belts, substantially as shown and described.

5. In a machine of the kind described the combination with the parallel longitudinally-disposed brushes adapted to rotate in opposite directions, of the parallel longitudinally-movable feed-belts between and below the said brushes for the purpose described.

ANDREW J. BUSH.

Witnesses:
CHAS. H. PARRISH,
J. M. MORROW.